United States Patent Office 3,816,598
Patented June 11, 1974

3,816,598
PROCESS FOR SURFACE TREATMENT OF
GRAPHITE FIBERS
Andrew L. Cunningham, Sr., Atlanta, Ga., assignor to
Lockheed Aircraft Corporation, Burbank, Calif.
Continuation-in-part of abandoned application Ser. No.
144,418, May 17, 1971. This application Apr. 6, 1972,
Ser. No. 241,725
Int. Cl. C01b 31/07
U.S. Cl. 423—447                                 7 Claims

ABSTRACT OF THE DISCLOSURE

A process for the surface treatment of intermediate and high modulus graphite or carbon fiber by subjecting the fiber to a non-aqueous gaseous atmosphere of oxygen in an inert carrier gaseous medium at an elevated temperature. Proper selection of the concentration of oxygen and of the temperature increases the interlaminar shear strength of a graphite fiber-resin composite with minimal weight loss of the fiber and minimal degrading (if any) the tensile properties of the fiber.

---

Figure 1:
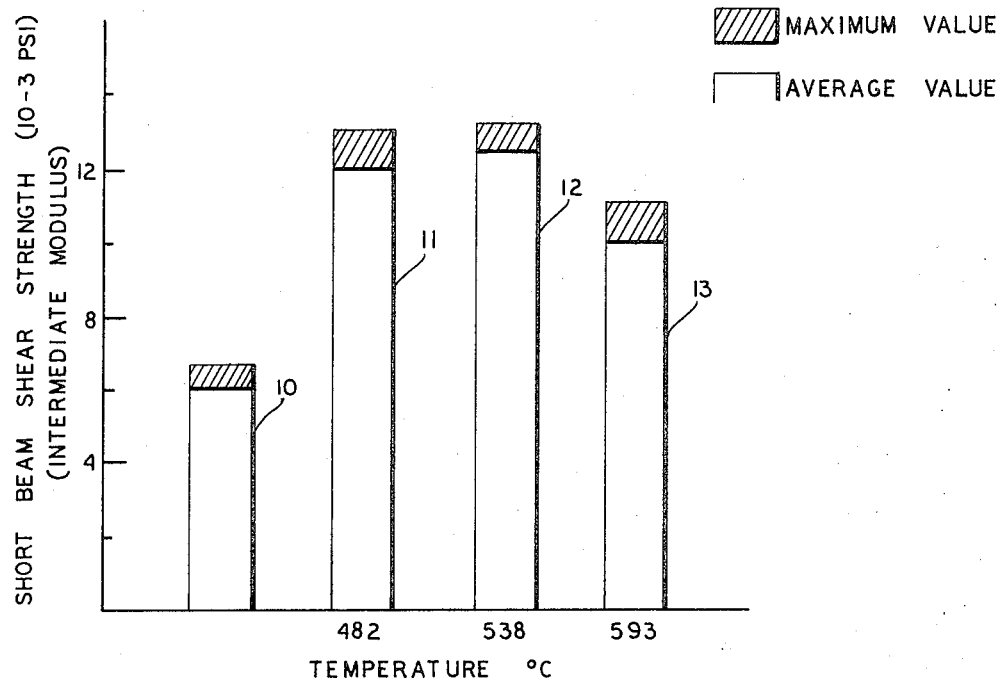

This is a continuation-in-part of application Ser. No. 144,418 filed May 17, 1971, now abandoned.

This invention relates in general to a treatment process and in particular to a process for treating the surface of graphite fiber to bring about an increase in the interlaminar shear strength of a fiber-epoxy composite made of such fibers resulting from an increase in the short beam shear strength property thereof.

The term "graphite fiber" is used herein to identify carbon fiber which has undergone at least partial pyrolyzation at elevated temperature converting it to a two-dimensional turbostratic grain structure or to a well-defined crystalline structure characteristic of graphite. Such graphite or carbon fibers as concerned herein are the result of a controlled or constructive pyrolysis of organic polymer fibers derived from various starting precursor materials as known in the art, and as exemplified by various cellulosic and polyacrylonitrile organic polymer precursors.

Graphite filament reinforced composite materials show considerable promise as a material for fabricating structural elements. Compared with conventional structure materials, graphite composite offer substantially increased strength and stiffness characteristic along with decreased weight for a given structural strength.

To utilize fully the beneficial mechanical properties of graphite fibers, the fibers must be bonded into a matrix having a rigid, definable shape which can be handled and which can transfer structural loading to the fibers. As is known to those skilled in the art, a graphite-epoxy composite material may be made by impregnating thin layers of graphite fibers with epoxy resin. A structural member may be made of those "pre-preged tapes" by laying the types one over the other to obtain a structure having the desired size and then curing the structure under pressure to bond all of the types into a unitary structural member.

Since the graphite-epoxy composite exists to transfer structural loads to the graphite fibers, it is important that the bond between each graphite fiber and the epoxy matrix is of sufficient strength to accomplish this load transfer. It has been desirable and advantageous to treat, prior to resin impregnation, the surface of graphite fibers in some manner to improve the fiber-matrix bond, which in turn, correspondingly improves the structural properties of the graphite-epoxy composite. To be effective, any process for treating the surface of graphite fibers to increase the interlaminar shear strength of the fibers must not significantly reduce the tensile strength of the fiber, since a reduction in the tensile strength of the fiber would correspondingly reduce the tensile characteristics of the fiber composite. There are a number of known processes for surface treating graphite fibers in an attempt to improve the interlaminar shear properties of the fibers; examples of such processes include sodium hypochlorite treatment, high temperature heat cleaning, and nitric acid digestion. While these prior art processes improve the interlaminar shear properties of graphite fiber to a greater or lesser extent, such processes also have attendant disadvantages such as an adverse effect on the tensile qualities of the fiber; and moreover, at least some of these prior processes are essentially batch-type processes which are not readily adaptable to continuous-run production of graphite fiber. A more detailed discussion of known surface treatment processes is found in Technical Report AFML-TR-68-357, Part II, dated March 1970, prepared for the Air Forc Materials Laboratory, Dayton, Ohio.

Accordingly, it is an object of the present invention to provide an improved process for treating the surface of graphite fiber.

It is another object of the present invention to provide a process for treating the surface of graphite fiber to improve the interlaminar shear properties of the fiber.

It is still another object of the present invention to provide a process for treating graphite fiber to improve the interlaminar shear properties of the fiber without significantly affecting the tensile qualties of the fiber in an adverse manner.

It is still another object of the present invention to provide a continuous on-line or production-run process for treating the surface of graphite fibers to improve the interlaminar shear properties of the fibers.

Figure 2:
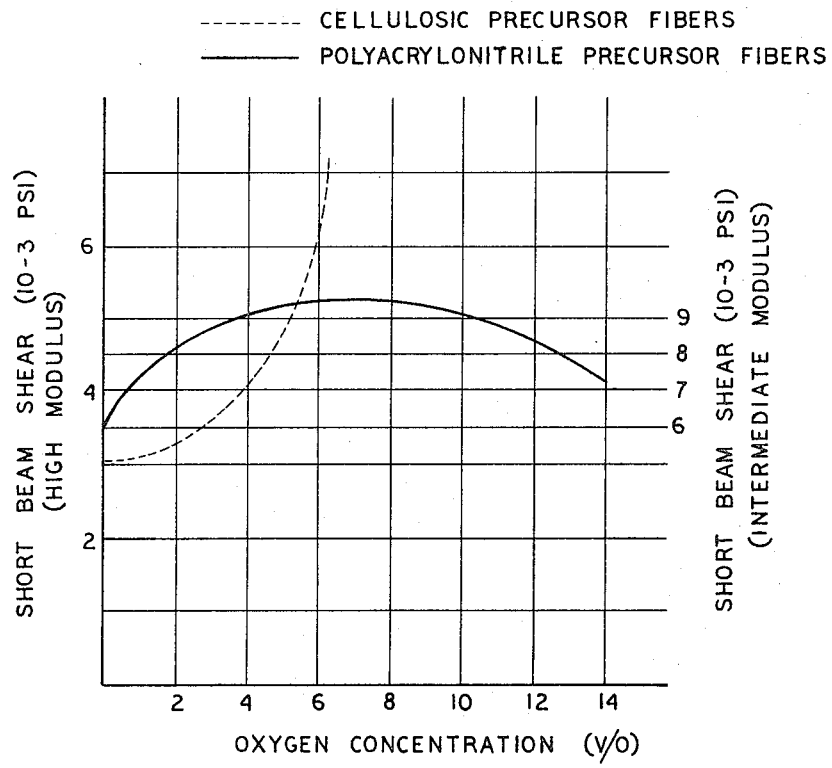

Other objects and many of the attendant advantages of the present invention will be readily apparent from the consideration of the description and preferred embodiment of the present invention set forth hereinafter taken in conjunction with the following drawings in which:

FIG. 1 shows short beam shear strength values for graphite fibers surface treated at various temperatures by the process disclosed herein, and which are compared to the corresponding value of fibers without surface treatment; and FIG. 2 shows the variation of short beam shear strength values on graphite fibers treated at 500° C. by the process disclosed herein with variation of the oxygen concentration on a volume-percent basis during the processing.

The process of the present invention accomplishes the desired surface treatment of cellulosic and polyacrylonitrile precursor graphite fibers by causing the direct surface oxidation of the fiber with a low volume fraction of oxygen dispersed in a dry, inert carrier gas, such as nitrogen. The surface oxidation is accomplished at a defined, moderately elevated temperature range, and the process may be applied to a continuous strand or strands of graphite fibers by passing the fibers through a furnace containing the desired oxygen-carrier gas atmosphere.

The direct oxidation of the graphite fiber surface, according to the present invention, occurs according to the following equation:

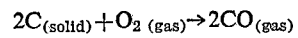

$$2C_{(solid)} + O_{2\ (gas)} \rightarrow 2CO_{(gas)}$$

The reaction of the foregoing equation is run at an elevated temperature, with the 482°–593° C. temperature range having been found to yield an increase in short beam shear strength with little or no significant decrease in the tensile qualities of the graphite fiber. Indeed, the tensile strength of graphite fibers in many cases is actually increased through the application of the present process.

The oxygen concentration preferably does not exceed 10 percent per volume. This present process has been most effectively run with oxygen volume concentrations in the $O_2$-carrier gas combination of about 2.0 percent up to about 6.0 percent, although the greatest percentage increase in short beam shear strength has been found to occur with an oxygen volume concentration in the range of about 4.0 percent to about 4.5 percent.

The following exemplary data was developed in support of the present invention by passing intermediate modulus graphite fiber (e.g. fiber having a stiffness ratio of 30–40×$10^6$ p.s.i.) through a furnace region 7¼ inches in length and having a non-aqueous atmosphere of oxygen in a nitrogen carrier gas.

The polyacrylonitrile precursor fibers were in the form of tows with each tow consisting of a non-twisted bundle containing approximately 10,000 individual graphite filaments of approximately 8–10 micron diameter, and the cellulosic precursor fibers were in the form of a two-ply yarn with each ply consisting of a non-twisted bundle containing approximately 720 individual graphite filaments of approximately 6–8 micron diameter.

A flow of the oxygen-nitrogen atmosphere through the furnace region is established as noted below, so that reaction products are continuously removed from the furnace region. Although the rate of atmosphere flow is not considered to be critical, this flow rate should be adequate to remove reaction products without being sufficiently great that the cooling effect of the supplied atmosphere causes a significant thermal gradient through the furnace region. Tests were run under laboratory conditions with the parameters and the measured results as shown in Table I, with the first run listed therein being that of an untreated graphite fiber used as a control. Corresponding increases in short beam strengths for high modulus graphite fibers (e.g. fiber having a stiffness ratio of 45–55+×$10^6$ p.s.i.) with substantial retention of fiber tensile strength and minimization of weight loss were also obtained through practice of this process.

TABLE I

| Run number | Temp., °C. | $O_2$ conc. (v/o) | Total gas flow ($O_2+N_2$), c.f.h. | Process rate (ft./hr.) | Weight loss, percent | Short beam shear (k.s.i.) | Fiber tensile strength (k.s.i.) |
|---|---|---|---|---|---|---|---|
| 1 (control) | | | | | | 6.7 | 220 |
| 2 | 482 | 4.5 | 1 | 5 | 0.359 | 12.51 | 238 |
| 3 | 482 | 4.5 | 1.0 | 6 | 0.484 | 12.15 | 230 |
| 4 | 482 | 4.5 | 1.0 | 12 | 0.052 | 12.11 | 224 |
| 5 | 538 | 4.5 | 1.0 | 5 | 1.19 | 12.31 | 236 |
| 6 | 538 | 4.5 | 1.0 | 5 | 0.930 | 11.43 | |
| 7 | 538 | 4.5 | 1.0 | 5 | 1.27 | 11.78 | |
| 8 | 538 | 4.5 | 1.0 | 12.0 | 0.406 | 12.43 | 259 |
| 9 | 593 | 4.5 | 1.0 | 5 | 1.28 | 11.03 | |
| 10 | 593 | 4.5 | 1.5 | 7.5 | 1.60 | 10.63 | 226 |
| 11 | 593 | 4.5 | 1.0 | 12.0 | 0.557 | 10.28 | 245 |
| 12 | 483 | (¹) | 1.0 | 12.0 | 0.136 | 11.4 | 222 |
| 13 | 538 | (¹) | 1.0 | 12.0 | 0.928 | 11.4 | 227 |

Dry air in a proportion to yield an oxygen volume concentration of 4.5 percent was substituted for pure oxygen in the case of runs 12 and 13 of Table I. Tensile strength values for runs 6, 7, and 9 could not be obtained because the sample length was too short for test purposes.

Each of the values of short beam shear strength recorded in Table I is an average of ten short beam shear tests of treated fiber-epoxy resin composite coupons made with graphite fiber treated as shown for the particular run member.

The effects of variation of surface treatment process temperature on short beam shear strengths are depicted in FIG. 1. Bar 10 represents the short beam shear strength values in the average range of 6–6.7 k.s.i. for graphite-resin composites utilizing fibers with untreated surfaces, while bars 11, 12 and 13 represents the increase of short beam shear strengths to an 11–12 k.s.i. range with maximum values approaching 13 k.s.i. The top of each clear bar portion represents the average value of all the fiber samples tested, while the top of the hatched portion of each bar represents the maximum value of all the fiber samples tested.

No appreciable change in short beam shear strength values over the untreated values of bar 10 were found below a processing temperature of 475° C., and at temperatures above 600° C. substantial decrease of fiber tensile strength and increase in fiber-weight loss resulted.

The effects of varying the oxygen percentage in operation of the present process are shown in the following series of runs, all of which were made in a pilot plant on graphite tow passing through a furnace region at 490° C. at a process rate of 6 ft./hr.

TABLE II

| | $O_2$ conc. (v/o) | Fiber tensile strength (k.s.i.) |
|---|---|---|
| Run number: | | |
| 1 | 2.3 | 263 |
| 2 | 3.0 | 195 |
| 3 | 4.0 | 215 |
| 4 | 5.0 | 255 |

Another series of tests under pilot plant conditions were run to determine the effect of oxygen concentration on short beam shear strength. The furnace region was again maintained at 490° C. and the process flow rate was 6 ft./hr.

TABLE III

| | $O_2$ conc. (v/o) | Short beam shear (k.s.i.) | Fiber tensile strength (k.s.i.) |
|---|---|---|---|
| Run number: | | | |
| 1 | 1.65–1.8 | 9.70 | 292 |
| 2 | 1.65–1.8 | 10.80 | 298 |
| 3 | 2.5 | 9.70 | 313 |
| 4 | 4.0 | 10.26 | 316 |

The results of Table III show that the short beam shear strength for all oxygen concentrations noted therein is substantially increased over the short beam shear strength of the untreated control graphite fiber as shown in run 1 of Table I. The variation of values shown in Tables II and III for fiber tensile strength is considered to have been caused by modification of the pilot plant furnace to minimize, if not eliminate, thermal gradient zones within the furnace that the fibers would pass through; this modification occurring between the time of making the runs of Table II and Table III, and do not indicate an adverse repeatability of the present process. Even the somewhat lower numerical values for fiber tensile qualities, as shown in Table II, however, show that the fiber tensile strength is at least substantially as good as that of the control in every instance except one, and in view of the scatter of fiber tensile strength obtained during various runs of fiber production where the physical property values can scatter as much as ±10%, the result of this one exception is not deemed unacceptable.

Referring now to FIG. 2, the curves show the effect of variations of volume-percent oxygen concentration in the carrier gaseous medium at 500° C. process temperature on the short beam shear strength of both intermediate and high modulus fibers made from both cellulosic and polyacrylonitrile precursors. As can be seen, the relative changes in short beam shear strength between the intermediate and high modulus fibers are substantially the same for identical oxygen concentrations except that the relative changes or relationships are on different scales. The reason for a difference in the curve shapes between the fibers made from a cellulosic precursor and a polyacrylonitrile precursor is not known, but is believed to derive from inherent property reactions during the surface treatment process due to different precursor materials.

Although nitrogen was used as the carrier gas for the examples described herein because of the relatively low cost of commercially-available dry nitrogen, any dry gas which is non-reactive to graphite in an atmosphere containing oxygen can be used as a carrier gas. For example, dry argon or dry helium are suitable as a carrier gas for the process described herein, although the cost of either of these gases is greater than the cost of dry nitrogen.

The time of subjecting the fiber to temperature, or soak time, in the controlled atmosphere in practicing this process is dependent upon the treatment temperature utilized along with recognition that an insufficient time will not materially effect or accomplish treatment of the fiber surface, and that subjecting the fiber to the treatment temperature for too long a period of time will result in excessive, if not complete, oxidation of the fiber. In this latter case, the net result is either a complete, catastrophic type of oxidation or burning up of fiber, or sufficient over-oxidation so as to significantly reduce the tensile properties of the fiber to worthless and meaningless values.

In the tests run on the practice of this process, it was found the period of time for subjecting fiber to the oxidizing treatment temperature to effect any appreciable increase in the interlaminar shear strength without significant degradation of tensile properties is from approximately 2.5 minutes to approximately 7.5 minutes. The optimum of fiber physical properties increases sought were attained with fibers treated at 482° C. for a period of just slightly over 6 minutes (i.e., 6.02 minutes) and with fibers treated at 593° C. for a period of just slightly over 3 minutes (i.e., 3.01 minutes). Thusly, by utilizing this process in a continuous-run manner in conjunction with or as an adjunct to fiber preparation equipment, the travel rate of the fiber through the surface treatment furnace can be the same as the fiber production rate, with the effective heating length of the surface treatment furnace in turn being determined or controlled by the treatment temperature desired to be utilized and the time of temperature treatment between the periods of approximately 2.5 minutes and approximately 7.5 minutes.

It should be understood, of course, that the foregoing relates only to a preferred embodiment of the invention and that numerous modifications or alterations may be made therein without departing from the spirit and scope of the invention as set forth in the appended claims.

What is claimed is:

1. The process for treating the surface of organic polymer derived graphite fiber consisting of: subjecting for a period of approximately 2.5 to 7.5 minutes the surface of a graphite fiber to a dry atmosphere mixture consisting essentially of oxygen in a gaseous carrier medium which is non-reactive to a graphite in an atmosphere containing oxygen, said dry atmosphere being at an elevated temperature of approximately 475°–600° C. and containing oxygen in an amount of about 1.65 to about 10 percent by volume.

2. The process as in claim 1, wherein said dry atmosphere contains from about 2 percent to about 6 percent by volume of oxygen.

3. The process as in claim 1, wherein said dry atmosphere is within the range of approximately 482° C. to 593° C.

4. The process as in claim 3, wherein said dry atmosphere contains from about 2 percent to about 6 percent by volume of oxygen.

5. The process as in claim 4, wherein said dry atmosphere contains from about 4.0 percent to about 4.5 percent by volume of oxygen.

6. The process in claim 4, wherein the surface of the graphite fiber is subjected to a temperature of approximately 482° C. for approximately 6 minutes duration.

7. The process in claim 4, wherein the surface of the graphite fiber is subjected to a temperature of approximately 593° C. for approximately 3 minutes duration.

References Cited

UNITED STATES PATENTS

| | | | |
|---|---|---|---|
| 3,723,607 | 3/1973 | Kalnin | 264—82 |
| 3,462,522 | 8/1969 | Clark et al. | 264—82 |
| 3,550,247 | 12/1970 | Evans et al. | 264—Dig. 19 |
| 3,573,961 | 4/1971 | Hawkins et al. | 264—Dig. 19 |
| 3,627,570 | 12/1971 | Cass et al. | 264—Dig. 19 |
| 3,627,571 | 12/1971 | Cass et al. | 264—Dig. 19 |
| 3,634,220 | 1/1972 | Goan | 264—Dig. 19 |
| 3,637,424 | 1/1972 | Miller | 264—Dig. 19 |
| 3,642,513 | 2/1972 | Sach et al. | 264—Dig. 19 |
| 3,695,916 | 10/1972 | Pike | 423—447 |
| 3,723,150 | 3/1973 | Druin et al. | 264—Dig. 19 |

FOREIGN PATENTS

| | | | |
|---|---|---|---|
| 1,124,807 | 12/1970 | Great Britain | 264—Dig. 19 |
| 1,180,441 | 2/1970 | Great Britain | 264—Dig. 19 |
| 1,238,308 | 7/1971 | Great Britain | 264—Dig. 19 |
| 8,995 | 4/1968 | Japan | 264—Dig. 19 |

OTHER REFERENCES

Samuel Steingiser et al., *Graphite Fiber Reinforced Composite*, Part 2, Technical Report AFML–TR–68–357, Part 2, March 1970 Air Force Systems Command, Wright-Patterson Air Force Base, Ohio, pp. 3, 24–27, 92–94.

JAY H. WOO, Primary Examiner

U.S. Cl. X.R.

106—307; 264—29, Dig. 19; 423—448, 460